United States Patent [19]

Menzenski

[11] Patent Number: 5,584,911

[45] Date of Patent: Dec. 17, 1996

[54] VAPOR RECOVERY SYSTEM WITH CYCLONIC SEPARATOR

[75] Inventor: Edward Menzenski, Prospect, Ky.

[73] Assignee: Jordan Holding Company, Fisherville, Ky.

[21] Appl. No.: 490,619

[22] Filed: Jun. 15, 1995

[51] Int. Cl.⁶ .................................................. B01D 53/04
[52] U.S. Cl. ......................... 95/94; 95/101; 95/102; 95/143; 95/185; 95/186; 95/198; 95/219; 95/261; 96/130; 96/133; 96/209
[58] Field of Search ................ 95/92–94, 101–103, 95/143, 146, 172, 185, 186, 198, 211, 216, 219, 261, 271; 96/121, 126–128, 130, 133, 209

[56] References Cited

U.S. PATENT DOCUMENTS

| | | | |
|---|---|---|---|
| 2,187,646 | 1/1940 | Darrieus | 95/261 |
| 2,604,185 | 7/1952 | Johnstone et al. | 95/219 |
| 2,853,149 | 9/1958 | Gosselin | 95/186 X |
| 3,011,966 | 12/1961 | Jahnentz et al. | 95/198 X |
| 3,183,645 | 5/1965 | Teller | 95/92 X |
| 3,266,262 | 8/1966 | Moragne | 62/54 |
| 3,385,029 | 5/1968 | De Vries | 95/92 |
| 4,066,423 | 1/1978 | McGill et al. | 55/48 |
| 4,276,058 | 6/1981 | Dinsmore | 55/48 |
| 4,279,628 | 7/1981 | Wymer et al. | 95/198 X |
| 4,331,456 | 5/1982 | Schwartz et al. | 95/101 X |
| 4,338,101 | 7/1982 | Tuttle | 95/93 |
| 4,343,629 | 8/1982 | Dinsmore et al. | 95/93 |
| 4,462,811 | 7/1984 | Dinsmore et al. | 95/92 X |
| 4,596,586 | 6/1986 | Davies et al. | 95/261 |
| 4,670,028 | 6/1987 | Kennedy | 95/92 |
| 4,715,868 | 12/1987 | Kennedy | 95/94 |
| 5,078,573 | 1/1992 | Peroaho et al. | 95/261 X |
| 5,154,735 | 10/1992 | Dinsmore et al. | 95/92 |
| 5,345,771 | 9/1994 | Dinsmore | 95/93 X |
| 5,426,945 | 6/1995 | Menzenski | 62/11 |
| 5,480,475 | 1/1996 | Tuttle | 96/130 X |

Primary Examiner—Robert Spitzer
Attorney, Agent, or Firm—King & Schickli

[57] ABSTRACT

A system is provided for recovering volatile-liquid vapor from an air-volatile liquid vapor mixture. The system includes a reaction vessel having a bed of adsorbent for adsorbing volatile liquid vapor and producing relatively volatile liquid vapor-free air. The system further includes a liquid seal vacuum pump for regenerating the adsorbent, a first conduit for circulating the air-volatile liquid vapor mixture through the system and a second conduit for circulating seal liquid to the vacuum pump. A cyclonic separator separates the seal liquid from the air-volatile liquid vapor mixture produced during bed regeneration. A mechanism is also provided for removing the volatile liquid vapor from the air-volatile liquid vapor mixture separated from the seal liquid. A method of recovering volatile liquid vapor from an air-volatile liquid vapor mixture is also disclosed.

14 Claims, 2 Drawing Sheets

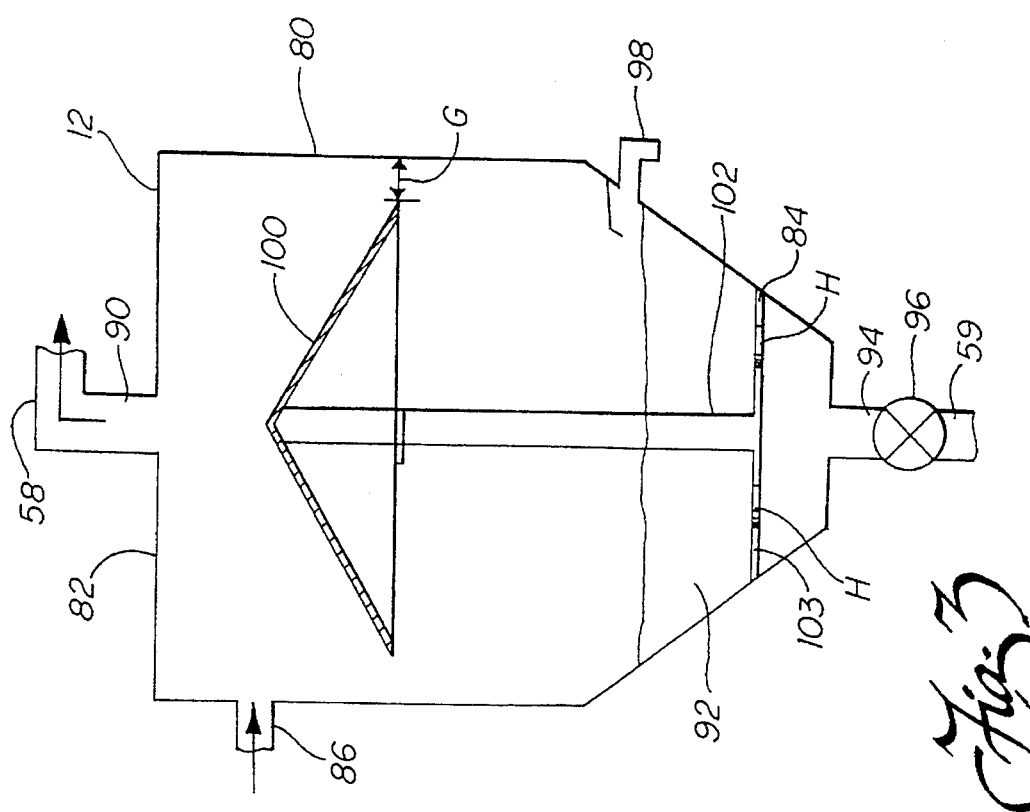
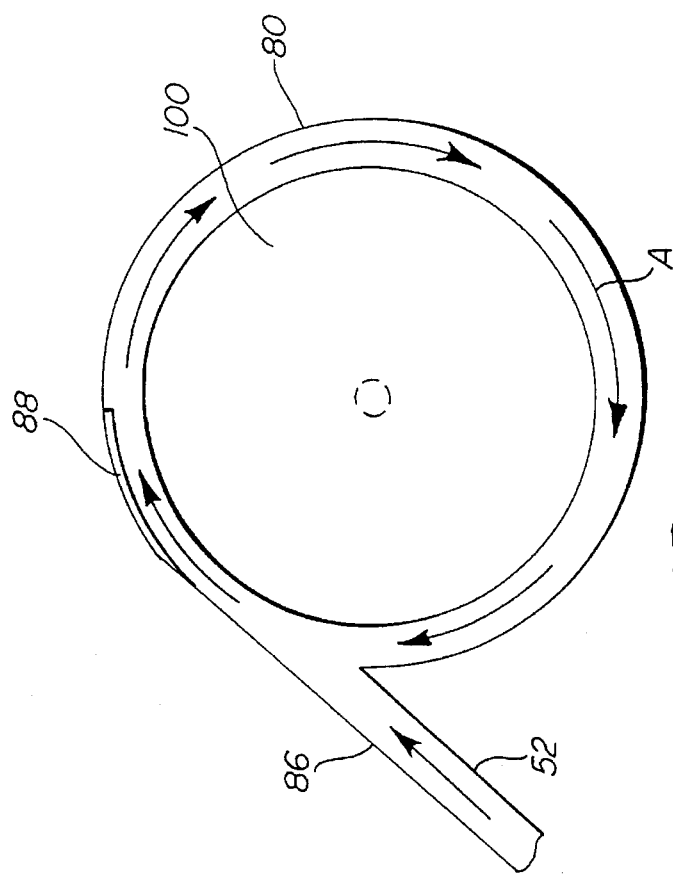

VAPOR RECOVERY SYSTEM WITH CYCLONIC SEPARATOR

TECHNICAL FIELD

The present invention relates generally to the field of volatile liquid vapor recovery and, more particularly, to an apparatus and a method for improving the efficiency of a vapor recovery system wherein the adsorbent beds of the system are regenerated using a liquid seal vacuum pump.

BACKGROUND OF THE INVENTION

When handling volatile liquids such as hydrocarbons including gasoline and kerosene, air-volatile liquid vapor mixtures are readily produced. The venting of such air-vapor mixtures directly into the atmosphere results in significant pollution of the environment and a fire or explosion hazard. Accordingly, existing environmental regulations require the control of such emissions.

As a consequence, a number of processes and apparatus have been developed and utilized to recover volatile liquids from air-volatile liquid vapor mixtures. Generally, the recovered volatile liquids are liquified and recombined with the volatile liquid from which they were vaporized thereby making the recovery process more economical.

The initial vapor recovery systems utilized in the United States in the late 1920's and early 1930's incorporated a process combining compression and condensation. Such systems were originally only utilized on gasoline storage tanks. It wasn't until the 1950's that local air pollution regulations began to be adopted forcing the installation of vapor recovery systems at truck loading terminals. Shortly thereafter, the "clean air" legislation activity of the 1960's, which culminated in the Clean Air Act of 1968, further focused nationwide attention on the gasoline vapor recovery problem. As a result a lean oil/absorption system was developed. This system dominated the marketplace for a short time.

Subsequently, in the late 1960's and early 1970's cryogenic refrigeration systems began gaining market acceptance (note, for example, U.S. Pat. No. 3,266,262 to Moragne). While reliable, cryogenic systems suffer from a number of shortcomings including high horsepower requirements. Further, such systems require relatively rigorous and expensive maintenance to function properly. Mechanical refrigeration systems also have practical limits with respect to the amount of cold that may be delivered, accordingly, the efficiency and capacity of such systems is limited. In contrast, liquid nitrogen cooling systems provide more cooling than is required and are prohibitively expensive to operate for this type of application.

As a result of these shortcomings, alternative technology was sought and adsorption/absorption vapor recovery systems were more recently developed. Such a system is disclosed in a number of U.S. patents including, for example, U.S. Pat. No. 4,276,058 to Dinsmore, the disclosure of which is fully incorporated herein by reference. Such systems utilize a bed of solid adsorbent selected, for example, from silica gel, certain forms of porous mineral such as alumina and magnesia, and most preferably activated carbon or charcoal. These adsorbents have an affinity for volatile hydrocarbon liquids. Thus, as the air-hydrocarbon vapor mixture is passed through the bed, a major portion of the hydrocarbons contained in the mixture is adsorbed on the bed. The resulting residue gas stream comprising substantially hydrocarbon-free air is well within regulated allowable emission levels and is exhausted into the environment.

It should be appreciated that the bed of adsorbent used in these systems is only capable of adsorbing a certain amount of hydrocarbons before reaching capacity and becoming ineffective. Accordingly, the bed must be periodically regenerated to restore the carbon to a level where it will effectively adsorb hydrocarbons again. This regeneration of the adsorbent is a two step process.

The first step requires a reduction in the total pressure by pulling a vacuum on the bed to remove the largest amount of hydrocarbons. The second step is the addition of a purge air stream that passes through the bed. The purge air polishes the bed so as to remove substantially all of the remaining adsorbed hydrocarbons. These hydrocarbons are then pumped to an absorber tower wherein lean oil or other nonvolatile liquid solvent is provided in a countercurrent flow relative to the hydrocarbon rich air-hydrocarbon mixture being pumped from the bed. The liquid solvent condenses and removes the vast majority of the hydrocarbons from that mixture and the residue gas stream from the absorber tower is recycled to a second bed of adsorbent while the first bed completes regeneration.

Generally, the vacuum pump utilized to evacuate the bed of adsorbent is typically a conventional liquid seal vacuum pump, also known as a liquid ring vacuum pump. Advantageously, liquid seal vacuum pumps are capable of producing high vacuums. They are also relatively inexpensive and generally safer to operate than other types of vacuum pumps when recovering flammable vapors.

A liquid seal vacuum pump utilizes a seal liquid that is circulated through the pump. The seal liquid, usually an ethylene glycol solution, may be circulated through a closed circuit or conduit. Usually, the seal liquid is also cooled and thereby has the effect of continuously cooling the pump and the gas or gases flowing through the pump. The resulting cooler operating temperatures advantageously serve to maximize the performance of the vacuum pump.

One shortcoming relating to the utilization of liquid seal vacuum pumps in vapor recovery systems of the type described relates to the fact that the seal liquid may be at least partially soluble or miscible with the volatile liquid vapor which the system is designed to recover. Accordingly, under certain operating conditions, the seal liquid may become so diluted with the recovered volatile liquid vapor that it can no longer properly function to allow the vacuum pump to operate at maximum efficiency and effectiveness while also minimizing component wear. Further, some seal liquid may be carried with the air-volatile liquid vapor mixture through the absorber tower and into one or more of the adsorbent beds. There, the seal liquid may detrimentally affect the adsorption capacity of the bed. In severe cases of such seal liquid contamination, it may even become necessary to shut down the vapor recovery system and replace the adsorbent in the beds.

Recognizing these significant potential adverse side effects of operating a liquid seal vacuum pump in a vapor recovery system, it has long been known to provide a separator for recovering the seal liquid from the air-volatile liquid vapor mixture produced during bed regeneration. In the past, such separators have relied upon gravity and the utilization of a demister pad to separate the liquid seal liquid from the air-volatile liquid vapor mixture evacuated from the reaction vessel undergoing bed regeneration. While such separators are relatively efficient and function well for their intended purpose, they do not approach 100% seal liquid recovery efficiency. Accordingly, some seal liquid still passes through the separator with the air-volatile liquid vapor mixture. Some of this seal liquid then passes through the absorber tower and is delivered to one or more of the adsorbent beds as the vapor recovery system cycles. There the seal liquid is captured by the adsorbent, detrimentally affecting the adsorption capacity of the bed. Over time this has the effect of diluting the seal liquid and thereby adversely affecting the operation of the vacuum pump. Further, the loss in the adsorption capacity of the bed gradually worsens until the performance of the vapor recovery system is noticeably impaired. Thus, a need is clearly identified for a new and improved vapor recovery system wherein there is provided more efficient and effective recovery of seal liquid from the air-volatile liquid vapor mixture evacuated from the bed of adsorbent undergoing regeneration.

SUMMARY OF THE INVENTION

Accordingly, it is a primary object of the present invention to provide an improved apparatus and method for the recovery of volatile liquids from an air-volatile liquid vapor mixture overcoming the above-described limitations and disadvantages of the prior art.

Another object of the present invention is to provide an apparatus for the recovery of volatile liquids from an air-volatile liquid vapor mixture wherein significant increases in removal efficiency are provided. Advantageously, this is accomplished without increasing the size of the adsorbent beds and without any substantial increases in the capital cost of the equipment. Instead, the system functions to better maintain the adsorption capacity of the beds of adsorbent and the operating efficiency of the liquid seal vacuum pump over time and from cycle-to-cycle.

Still another object of the present invention is to provide an adsorption/absorption vapor recovery system incorporating at least one adsorbent bed, a liquid seal vacuum pump for regenerating the bed, a cyclonic separator for recovering seal liquid, and an absorber tower or cooler for recovering/condensing volatile liquid vapor.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved system is provided for recovering volatile liquid vapor from an air-volatile liquid vapor mixture. Broadly describing the invention, the system includes a means for adsorbing volatile liquid vapor. The adsorbing means specifically includes a reaction vessel having a bed of adsorbent such as activated charcoal or carbon having an infinity for the volatile liquid vapor to be recovered by the system. Specifically, as the air-volatile liquid vapor mixture is passed through the bed of adsorbent, the volatile liquid vapor is adsorbed and captured in the adsorbent and a relatively volatile liquid vapor-free air is produced.

The system also includes means for regenerating the bed of adsorbent and releasing the previously adsorbed volatile liquid vapor therefrom. Preferably, the regenerating means includes a liquid seal vacuum pump for selectively evacuating the bed of adsorbent in the reaction vessel. Additionally, the system includes first and second conduit means. The first conduit means is for circulating the air-volatile liquid vapor mixture through the vapor recovery system. The second conduit is essentially an independent circuit for circulating a seal liquid to the liquid seal vacuum pump so that the pump may continuously operate at maximum efficiency with minimal wear. Of course, to achieve this end, as described in the background section above, seal liquid of an appropriate concentration must be continuously provided during pump operation.

In order to do this the system also includes a cyclonic separator specifically adapted for separating the seal liquid vapor from the air-volatile liquid mixture that is produced during bed regeneration. In addition, the system includes the means for removing the volatile liquid vapor from the air-volatile liquid vapor mixture generated during bed regeneration. Such a removing means may, for example, comprise an absorber tower and/or a cooler connected to a refrigeration unit. Either or both devices function to adsorb/condense the volatile liquid vapor from the air-volatile liquid vapor mixture whereby the condensed volatile liquid vapor may be recovered. The air exhausted from the absorber tower/cooler is usually directed through a second bed of adsorbent to complete the recovery of volatile liquid vapors as well as the air cleaning process.

In accordance with a more specific aspect of the present invention, the cyclonic separator preferably includes a tangentially directed inlet that receives the air-volatile liquid vapor mixture along with entrained seal liquid delivered from the liquid seal vacuum pump. The cyclonic separator also includes a first outlet for delivery of the separated air-volatile liquid vapor mixture produced during bed regeneration to the absorber tower or cooler where the volatile liquid vapor is condensed and recovered. A second, separate outlet is provided in the cyclonic separator for delivering the separated seal liquid back through the second circuit to the liquid seal vacuum pump. Additionally, the cyclonic separator may include a third outlet for recovering any condensed volatile liquid vapor that may collect and float on the seal liquid.

So that the separation efficiency of the cyclonic separator may be maximized, the cyclonic separator may also include an internal baffle of substantially conical shape. Preferably, the internal baffle is concentrically received within the outer wall of the cylindrically shaped cyclonic separator. This baffle acts as a vortex breaker to provide a quiescent surface below the baffle which will aid further separation.

In accordance with yet another aspect of the present invention, a method is provided for recovering volatile liquid vapor from an air-volatile liquid vapor mixture. The method includes the steps of: (1) adsorbing onto an adsorbent volatile liquid vapor from the air-volatile liquid vapor mixture so as to thereby produce relatively volatile liquid vapor-free air; (2) regenerating the bed of adsorbent by vacuum regeneration using a liquid seal vacuum pump and seal liquid; (3) separating the air-volatile liquid vapor mixture produced during regeneration from the seal liquid using a cyclonic separator; and (4) removing the volatile liquid vapor from the air-volatile liquid vapor mixture produced during regeneration.

Advantageously, as outlined above in the presentation of the objectives of this invention, the present system and method function to more efficiently separate the seal liquid from the air-volatile liquid vapor mixture produced during bed regeneration than has been found possible with prior art approaches. This advantageously helps the vapor recovery process as a more desired concentration of seal liquid is consistently provided for circulation through the vacuum pump over time resulting in a lower vapor pressure that keeps vacuum pump operation at peak efficiency. Further, by preventing seal liquid carryover into the absorber tower and the beds of adsorbent, the adsorption capacity of the beds is better maintained thereby allowing more efficient and effective operation over a longer relative service life.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 2 is a schematical cross-sectional view of the cyclonic separator of the vapor recovery system shown in FIG. 1 taken along line 2—2;

FIG. 3 is a schematical cross-sectional view of the cyclonic separator of the vapor recovery system shown in FIG. 1 taken along line 3—3.

Figure 1:
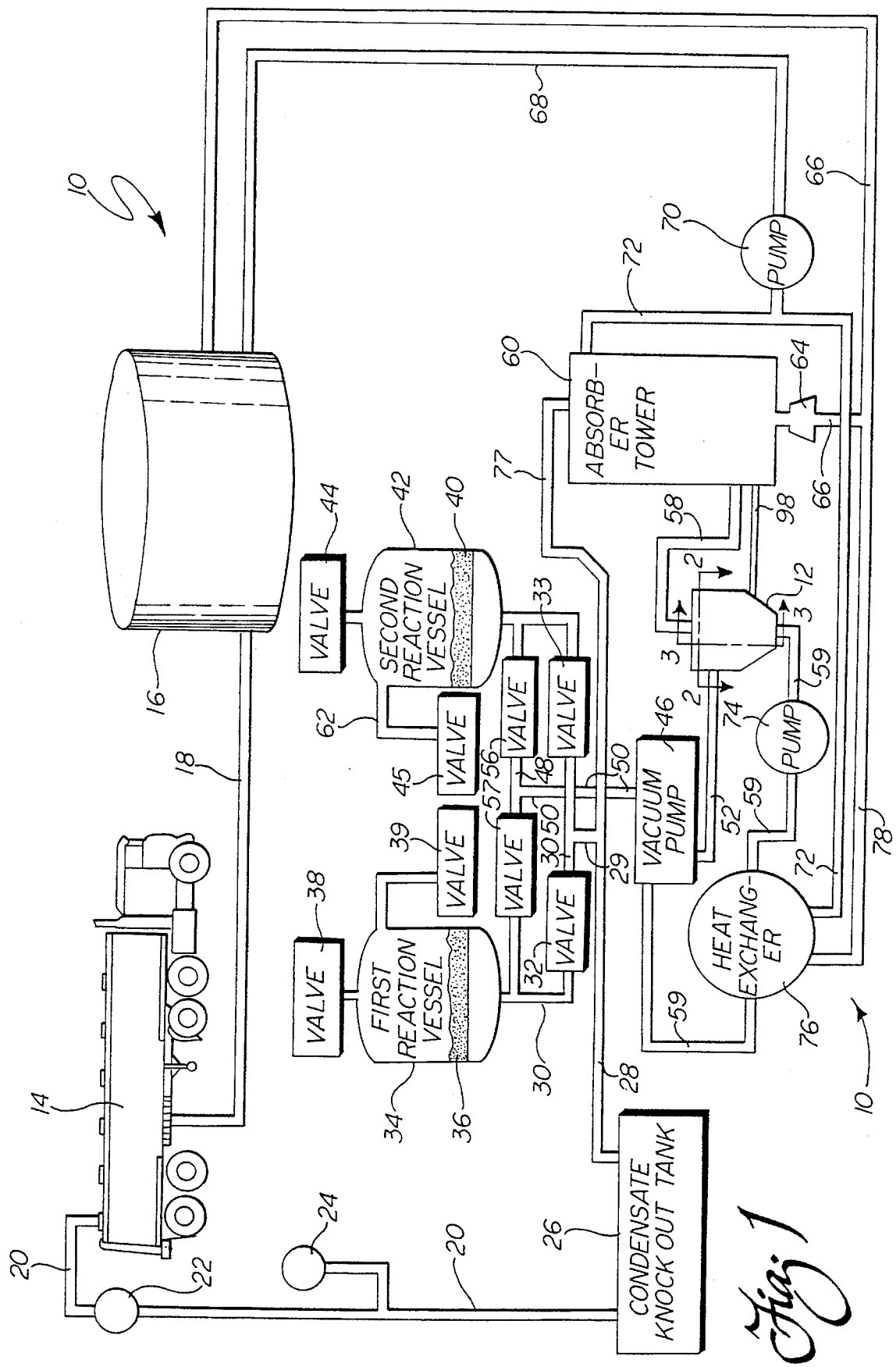
FIG. 1 is a schematical diagram showing the volatile liquid vapor recovery system of the present invention incorporating a cyclonic separator.

Reference will now be made in detail to the present preferred embodiment of the invention, an example of which is illustrated in the accompanying drawing.

DETAILED DESCRIPTION OF THE INVENTION

Reference is now made to FIG. 1 showing the volatile liquid vapor recovery system 10 of the present invention incorporating a cyclonic separator 12. As will become apparent as the description hereof proceeds, cyclonic separator 12 functions to significantly enhance the operating efficiency and productivity of the adsorption/absorption vapor recovery system 10 by both reducing the operating cost, extending the time between pump and bed maintenance requirements and increasing system efficiency and throughput. The vapor recovery system 10 is generally of the type disclosed and described in co-pending U.S. patent application Ser. No. 08/380,483 to Jordan entitled "Absorber Fluid Circuit For Vapor Recovery System", now U.S. Pat. No. 5,515,686, the disclosure of which is fully incorporated herein by reference.

As shown the vapor recovery system 10 is particularly suited to the recovery of vaporized hydrocarbons of the type expelled from trucks, tank cars and other vessels 14 as they are loaded with hydrocarbons from a storage tank 16 through a feed line 18. More particularly, those vapors are collected as an air-hydrocarbon vapor mixture in a collection line 20, attached to the truck 14 and delivered past a vapor check valve 22 and pressure/vacuum vent 24 to a condensate knock-out tank 26. From there, the air-hydrocarbon vapor mixture passes along the lines 28, 29 and 30 past open valve 32 (valve 33 is closed) to the first reaction vessel 34 including a first bed of absorbent 36. The bed 36 adsorbs the volatile hydrocarbon vapors and clean air is exhausted past the valve 38 into the environment, valve 39 being closed.

Simultaneously, the adsorbent bed 40 in the second reaction vessel 42 is being regenerated: that is, the capacity of the bed 42 to adsorb vapor is being renewed. To achieve this end, valves 44 and 45 are initially closed and the vacuum pump 46 is operated to pull a vacuum on the bed 40 in the second reaction vessel 42. Generally, as is known in the art, a liquid ring, two-stage vacuum pump having a capacity of 100–2000 cfm is utilized for this purpose. Such a pump may, for example, be obtained from Graham Vacuum Pump of Batavia, N.Y. (e.g. Model 2V7240).

As the pump 46 draws the vacuum down in the reaction vessel 42 to 22–28 inches of mercury vacuum, a mixture of air and volatile liquid vapor is pulled from the bed 40. This mixture is directed by the pump 46 through conduits 48, 50, 52 into the sealing fluid separator 12 by operation of the valve 56 (open) and the valve 57 (closed). The sealing fluid separator 12 separates the pump sealing fluid, required for proper operation of the liquid ring, two-stage vacuum pump, from both the condensed hydrocarbons that are recovered and the air-vapor mixture that is directed through conduit 58 to the absorber tower 60. As will be described in greater detail below, the sealing fluid recovered from the separator 12 is recirculated through the conduit lines 59 to the pump 46.

Toward the end of the regeneration cycle, (e.g. when a specific vacuum level is reached or for a specific time such as the last one to two minutes of an approximately 10–17 minute cycle), a small quantity of purge air is introduced into the reaction vessel 42 by opening valve 45. This purge air is drawn from the ambient atmosphere through line 62 and is passed through the bed 40 to polish the absorbent clean of the remaining hydrocarbons. During this process it should be appreciated that the purge air is only introduced into the bed 42 at a rate sufficient to substantially maintain a pressure of approximately 22–28 and more preferably 25–27 inches of mercury vacuum. The purge air and the last of the hydrocarbons is also directed by the pump 46 through the separator 12 and conduit 58 to the absorber tower 60.

As is known in the art, the absorber tower 60 provides a countercurrent flow of solvents such as lean oil by means of a dispersal sprayer (not shown). The lean oil serves to condense the hydrocarbon vapors from the air-hydrocarbon vapor mixture drawn from the reaction vessel 42 by the pump 46 as just described.

The condensed hydrocarbons and lean oil are preferably collected from the bottom of the absorber tower 60 by operation of a venturi tube 64 and then delivered via conduit 66 to the storage tank 16. Preferably, the venturi tube 64 is able to pump between 25–200 gallons per minute. The sizing of the venturi tube depends upon the head pressure in the gasoline storage tank 16 and the desired pump or flow rate. The venturi tube 64 may be of a size from 1–12 inches and may, for example, be obtained from Penberthy of Prophetstown, Ill. By using a venturi tube 64 instead of a centrifugal pump of a type used in the prior art, it is possible to eliminate this mechanical device from the system 12 thereby reducing original equipment, maintenance and operating costs. It should be appreciated, however, that the well known centrifugal pump may still be used in place of the venturi tube 64 if desired.

The residue air that exits from the absorber tower 60 is largely free of volatile liquid vapor. It, however, is preferably recirculated or recycled for introduction into the first reaction vessel 34 via the conduits 77 and 30. In this way, any residual volatile liquid vapor may be captured in the bed 36 to complete the cleaning of the air prior to exhausting into the environment past valve 38.

Of course, as is well known in the art it should be appreciated that the reaction vessels 34 and 42 are essentially identical and that the operation thereof may be reversed as required to provide for continuous processing. This means that when the bed 36 is saturated, the bed 36 may be regenerated in the manner described above with reference to the bed 42 while the bed 42 is simultaneously utilized to capture hydrocarbons in the manner described above with reference to the bed 36. This is accomplished by simply reversing the operation of the valve pairs 32 and 33, 56 and 57, 38 and 44, and 39 and 45, respectively to control the flow through the vapor recovery system 10.

As should be further appreciated from viewing FIG. 1, lean oil is withdrawn from the storage tank 16 through a first conduit 68 connected to the inlet of the supply pump 70. Supply pump 70 provides a pumping capacity of preferably between 50–400 gallons a minute and, therefore, may vary from 2–15 horsepower. The outlet of the supply pump 70 is connected to a second conduit 72 that directs the lean oil to both the absorber tower 60 and a heat exchanger 76 for cooling the seal liquid of the vacuum pump 46. The lean oil flow is split approximately 50/50 between the heat exchanger 76 and the absorber tower 60. If desired, however, a flow control valve may, of course, be provided to adjust the flow to any desired ratio required for most efficient processing. Preferably, the absorber tower 60 is a packed absorber tower such as available from Jordan Technologies Inc. under the model designation B-1. The heat exchanger is preferably a tubing shell as manufactured, for example, by BASCO of Buffalo, N.Y.

As described above, during processing, seal liquid is recovered from the air-hydrocarbon vapor mixture and condensates in the separator 12 and then circulated by pump 74 at a rate of 5–100 gallons a minute through conduit lines 59 and the heat exchanger 76 back to the vacuum pump 46. In the heat exchanger 76, heat is transferred from the seal liquid to the lean oil which is then returned through conduit lines 78, 66 back to the storage tank 16. As a result, the vacuum pump 46 operates at a cooler temperature and, therefore, a greater efficiency. Accordingly, bed regeneration is completed in a shorter period of time. Operating costs are therefore reduced while system efficiency and throughput are increased.

During processing, the absorber tower 60 also receives a continuous flow of "cool" lean oil to maximize the absorption efficiency in the absorber tower and thereby enhance the generation and recovery of hydrocarbon vapor condensate. As a result, cleaner air is discharged to the second bed through conduits 77 and 30. Accordingly, system efficiency is again improved.

The improved efficiencies of the vapor recovery system 10 is maintained over time and from cycle-to-cycle by the cyclonic separator 12. As best shown with reference to FIGS. 2 and 3, the separator 12 comprises a housing with a substantially cylindrical side wall 80, a top wall 82 and substantially truncated funnel shaped bottom wall 84.

As the vacuum pump 46 operates to evacuate one of the reaction vessels 34, 42 and therefore, regenerates one of the beds 36, 40, an air-hydrocarbon vapor mixture with a high concentration of hydrocarbon vapor and some entrained seal liquid passes through the vacuum pump 46 into the inlet 86 of the separator 12. As best shown in FIG. 2, the inlet 86 is oriented tangentially relative to the side wall 80 and a reinforced impingement wear plate 88 functions to protect the side wall 80 from erosion.

With the air-volatile liquid vapor mixture and entrained seal liquid being tangentially directed by the inlet 86, a swirling clockwise flow or current of circulation is established in the separator 12 (note action arrow A in FIG. 2). This swirling flow is further promoted by the provision of a baffle 100. As shown, the baffle 100 is preferably of conical shape and is mounted concentrically within the sidewall 80 of the separator 12 by means of a post 102 supported on a series of spaced brackets 103 (only two shown in FIG. 3). Advantageously, the conical upper surface of the baffle 100 tends to support and thereby enhance the generation of the swirling clockwise current shown by action arrow A. Further, an annular gap G is maintained between the outer peripheral edge of the baffle 100 and the inner surface of the side wall 80. The relatively heavy seal liquid passes through this gap G whereupon it collects in the pool 92.

It should be appreciated that the cyclonic separator 12 provides a number of important advantages over separators of other design as used in the prior art which rely strictly upon gravity to complete separation. First and foremost, the swirling current is sufficiently strong to produce a force greater than gravity to promote separation. Accordingly, separation efficiency is enhanced. More seal liquid is, therefore, returned to the seal liquid circuit in each operating cycle so that the proper concentration of seal liquid is provided for best pump operation. Further, less seal liquid is passed through with the air-hydrocarbon vapor mixture to the beds of adsorbent 36, 40. Thus, the adsorption capacity of the beds 36, 40 are not compromised by seal liquid contamination and this prevalent problem of the prior art is significantly reduced or eliminated.

As a result the lighter components of the mixture (i.e. the air and hydrocarbon vapor) are swept upwardly through the axial outlet 90 connected to the conduit line 58 leading to the absorber tower 60. In contrast, the heavier seal liquid gradually sinks in the separator 12 and is collected in the pool 92 adjacent to the bottom wall 84. A second axial outlet 94 is connected to the conduit line 59 for delivering the seal fluid collected in the separator 12 to the pump 74 for recirculation back to the vacuum pump 46. It should further be appreciated that holes H in the mounting brackets 103 allow the pool of seal liquid to be drained through the outlet 94. A flow control valve 96 may be adjusted to meter the rate of flow to maintain equilibrium conditions (i.e. the appropriate level of the pool 92 in the separator 12).

An additional outlet 98 may also be provided at a location at approximately the equilibrium level of the pool 92. Any hydrocarbon vapor that condenses in the separator 12 also sinks downwardly with the seal liquid. As it is less dense than the seal liquid, however, it floats on the pool 92 and may be collected as overflow through the outlet 98 through which it may be delivered to the absorber tower 60 for recovery. This gravity separation of the hydrocarbon from the seal liquid is effected with excellent efficiency as the baffle 100 effectively functions to screen the pool 92 from the swirling current so the pool remains calm for best separation.

In one embodiment of the present invention, the separator has a total cubic capacity of approximately 350 gallons. The side wall 80 has a diameter of about 4.0 ft and a circumference of approximately 12.5 ft and the outer periphery of the baffle 100 has a diameter of about 3 ft and a circumference of approximately 9.4 ft providing an annular gap G with a width of approximately 5¾" (accounting for the ¼" vessel wall).

In summary, numerous benefits result from employing the concepts of the present invention. Specifically, by incorporating a cyclonic separator 12 into the vapor recovery system 10 of the present invention, it is possible to apply centrifugal energy to the separation process and thereby enhance separation of the seal liquid from the air-volatile liquid vapor mixture produced as a result of the regeneration of the bed of the adsorbent. Accordingly, seal liquid is better maintained in the seal liquid circuit thereby maximizing the operation efficiency of the vacuum pump. Hence, bed regeneration may be completed to the desired level in a shorter period of time and the productivity of the system is enhanced. Further, seal liquid concentrations remain at the necessary levels to provide the most efficient operation and protection of pump components from wear. Additionally, the enhanced separation and recovery of seal liquid prevents the seal liquid from passing with the air-volatile liquid vapor through the absorber tower to the beds of adsorbent where, over time, the seal liquid would otherwise detrimentally affect the adsorptive capacity of the adsorbent. Thus, this drag on productivity and efficient operation of the system is substantially reduced or avoided.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A method for recovering a volatile liquid vapor from an air-volatile liquid vapor mixture, comprising:

adsorbing onto an adsorbent the volatile liquid vapor from the air-volatile liquid vapor mixture and thereby producing volatile liquid vapor-free air;

regenerating said adsorbent by vacuum regeneration using a liquid seal vacuum pump and seal liquid;

separating the air-volatile liquid vapor mixture from the seal liquid using a cyclonic separator; and removing the volatile liquid vapor from the air-volatile liquid vapor mixture.

2. A system for recovering a volatile liquid vapor from an air-volatile liquid vapor mixture, comprising:

means for adsorbing the volatile liquid vapor, said adsorbing means including a reaction vessel having a bed of adsorbent for adsorbing the volatile liquid vapor and producing relatively volatile liquid vapor-free air;

means for regenerating said bed of adsorbent and releasing the volatile liquid vapor previously adsorbed, said regenerating means including a liquid seal vacuum pump for selectively evacuating said bed of adsorbent in said reaction vessel;

a first conduit for circulating the air-volatile liquid vapor mixture through said system;

a second conduit for circulating a seal liquid to said liquid seal vacuum pump;

a cyclonic separator for separating said seal liquid from said air-volatile liquid vapor mixture; and means for removing the volatile liquid vapor from the air-volatile liquid vapor mixture generated during bed regeneration.

3. The system set forth in claim 2, wherein said adsorbent is activated carbon.

4. The system set forth in claim 3, wherein said volatile liquid is a hydrocarbon vapor.

5. The system set forth in claim 4, wherein said seal liquid is ethylene glycol.

6. The system set forth in claim 5, wherein said cyclonic separator includes a tangentially directed inlet for receiving the air-volatile liquid vapor and seal liquid mixture received from said liquid seal vacuum pump, a first outlet for separated air-volatile liquid vapor mixture, a second outlet for separated seal liquid and a third outlet for any condensed volatile liquid vapor.

7. The system set froth in claim 6, wherein said cyclonic separator includes an internal baffle of substantially conical shape.

8. The system set froth in claim 7, wherein said volatile liquid vapor removing means includes a cooler for condensing said volatile liquid vapor from said air-volatile liquid vapor mixture.

9. The system set forth in claim 7, wherein said volatile liquid vapor removing means includes an absorber tower for absorbing said volatile liquid vapor from said air-volatile liquid vapor mixture.

10. The system set forth in claim 2, wherein said cyclonic separator includes a tangentially directed inlet for receiving said air-volatile liquid vapor mixture and said seal liquid received from said liquid seal vacuum pump, a first outlet for separated air-volatile liquid vapor mixture, a second outlet for separated seal liquid and a third outlet for any condensed volatile liquid vapor.

11. The system set froth in claim 10, wherein said cyclonic separator includes an internal baffle of substantially conical shape.

12. The system set froth in claim 11, wherein said volatile liquid vapor removing means includes a cooler for condensing said volatile liquid vapor from said air-volatile liquid vapor mixture.

13. The system set forth in claim 11, wherein said volatile liquid vapor removing means includes an absorber tower for absorbing said volatile liquid vapor from said air-volatile liquid vapor mixture.

14. A system for recovering a volatile liquid vapor from an air-volatile liquid vapor mixture, comprising:

an adsorbent for adsorbing the volatile liquid vapor and producing relatively volatile liquid vapor-free air;

an adsorbent regenerator for releasing the volatile liquid vapor previously adsorbed, said regenerator including a liquid seal vacuum pump;

a first conduit for circulating the air-volatile liquid vapor mixture through said system;

a second conduit for circulating a seal liquid to said liquid seal vacuum pump; and a cyclonic separator for separating said seal liquid from said air-volatile liquid vapor mixture.

* * * * *